(No Model.)
H. AVERKAMP.
APPARATUS FOR PICKLING MEAT.
No. 550,151. Patented Nov. 19, 1895.
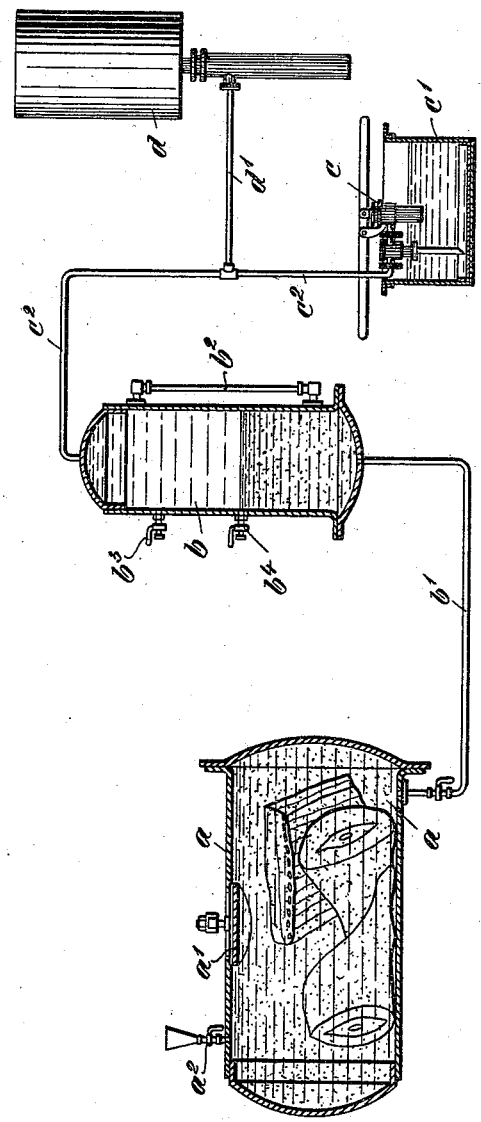
Witnesses
Johannes Irrmisch.
Emil Kayser.
Inventor
Hermann Averkamp.
by
Robert Ziegler
Attorney.

UNITED STATES PATENT OFFICE.

HERMANN AVERKAMP, OF BERLIN, GERMANY.

APPARATUS FOR PICKLING MEAT.

SPECIFICATION forming part of Letters Patent No. 550,151, dated November 19, 1895.

Application filed February 14, 1895. Serial No. 538,451. (No model.)

*To all whom it may concern:*

Be it known that I, HERMANN AVERKAMP, a subject of the King of Prussia, German Emperor, and a resident of Berlin, in the Kingdom of Prussia, German Empire, have invented a certain Improved Device for Pickling Meat, of which the following is an exact specification.

In the method used up to now for pickling smaller pieces of meat the latter have to remain within the brine for about four weeks in order to be thoroughly soaked with the brine. If the respective pieces of meat are of a comparatively-large size, there are, even after the said long period of time, the inner parts pickled either but insufficiently or not at all, in that the brine is hindered from entering those parts by the air contained therein. Trials made to expel the air out of those parts by introducing the brine into the latter by means of a syringe have failed.

The purpose of my invention, therefore, is to overcome the drawback aforementioned, and I attain that object by exposing the brine containing the meat to a strong pressure and maintaining the latter until all the air is perfectly expelled. I have found by extensive experiments that generally not more than four hours are necessary for pickling even very large pieces of meat down into their innermost parts. In carrying this method into practice I prefer to make use of the apparatus shown in the accompanying drawing, in which—

$a$ is the pickling-vessel proper, which is provided with a cover $a'$ and an air-cock $a^2$.

$b$ is a reservoir filled with brine up to the level of the highest point of vessel $a$ and connected with said vessel by a pipe $b'$. Said reservoir is furnished with a gage-glass $b^2$ and with cocks $b^3$ $b^4$.

$c$ is a pump arranged within a tank $c'$ and connected by a pipe $c^2$ with the upper portion of reservoir $b$.

$d$ is an accumulator, the cylinder of which is connected by pipe $d'$ with the pipe $c^2$ aforementioned.

After the pieces of meat to be pickled have been introduced into vessel $a$ the latter is filled with the brine. The latter flows over also into the reservoir $b$ and fills the same up to the level of the highest point of the vessel $a$, as already stated. Vessel $a$ is then closed by means of its cover $a'$ and pump $c$ is set agoing, so as to force a suitable fluid or liquid—as, for instance, air or water—into the reservoir $b$ and upon the brine contained therein. The action of the pump is continued until a pressure of about fifty atmospheres is reached.

It will be seen that the same pressure is exerted upon the accumulator and that the latter will commence to react as soon as the pump has ceased to work. The pressure exerted upon the brine and the meat will thus be continued and all the air contained within the meat will be expelled and replaced by the brine. A few hours' duration of the pressure is sufficient for thoroughly pickling the largest piece of meat.

Having thus fully described the nature of this invention, what I desire to secure by Letters Patent of the United States, is—

In a plan for pickling pieces of meat by exposing the brine containing the meat to pressure by aid of a pump; the combination with a vessel containing the meat and the brine, of a reservoir intercalated between said vessel and said pump, and of a tank adapted to contain water; the said pump being adapted to force said water into the said reservoir, and upon the brine contained therein; an accumulator connected to the reservoir as well as to the pump, for the purpose as described.

In testimony whereof I have signed this specification in the presence of two subscribing witnesses.

HERMANN AVERKAMP.

Witnesses:
   FRITZ SPERLING,
   WM. HAUPT.